(12) United States Patent
Nishida et al.

(10) Patent No.: US 6,484,375 B1
(45) Date of Patent: Nov. 26, 2002

(54) LOCKING RETAINER DEVICE

(75) Inventors: Yasutaka Nishida, Macon, GA (US); John Valdes, Macon, GA (US)

(73) Assignee: YKK Corporation of America, Marietta, GA (US)

( * ) Notice: Subject to any disclaimer, the term of this patent is extended or adjusted under 35 U.S.C. 154(b) by 0 days.

(21) Appl. No.: 09/879,978

(22) Filed: Jun. 14, 2001

(51) Int. Cl.[7] .............................................. A44B 21/00
(52) U.S. Cl. ....................................... 24/598.2; 24/616
(58) Field of Search .................. 24/DIG. 50, 587.12, 24/616, 615, 20 TT, 16 R, 16 PB, 30.5 R, 30.5 P, 17 AP, 17 A, 265 AL, 614, 618, 598.2; 292/322, 307 A; 248/74.3; 70/457, 458

(56) References Cited

U.S. PATENT DOCUMENTS

| | | | | |
|---|---|---|---|---|
| 3,118,200 A | * | 1/1964 | Bell | |
| 3,422,499 A | * | 1/1969 | Merser | |
| 3,515,363 A | * | 6/1970 | Fisher | |
| 3,517,702 A | * | 6/1970 | Mueller et al. | |
| 4,248,462 A | * | 2/1981 | Choi | |
| 4,260,111 A | * | 4/1981 | Menzel | |
| 4,317,262 A | * | 3/1982 | Wells, Jr. | |
| 5,216,784 A | * | 6/1993 | Dyer | |
| 5,322,037 A | * | 6/1994 | Tozawa | |
| 5,402,554 A | * | 4/1995 | Oetiker | |
| 5,669,118 A | * | 9/1997 | Frano et al. | |
| 5,781,970 A | * | 7/1998 | Anscher | |
| 5,920,968 A | * | 7/1999 | Anscher | |
| 5,940,944 A | * | 8/1999 | Anscher | |
| 6,088,885 A | * | 7/2000 | Galbreath | |
| 6,101,690 A | * | 8/2000 | Giampavolo et al. | |
| 6,138,330 A | | 10/2000 | Galbreath | |

* cited by examiner

*Primary Examiner*—James R. Brittain
(74) *Attorney, Agent, or Firm*—Kramer and Associates, P.C.

(57) ABSTRACT

A locking retainer includes a flexible band including an outer surface, an inner surface substantially parallel to and spaced from the outer surface, a first end, and a second end. A first plug member is integrally attached to the first end of the flexible band and includes an extending member having a first end, a second end, and top and bottom surfaces. The first plug member includes a first prong extending from the top surface of the extending member, and a second prong extending from the bottom surface of the extending member. A second plug member integrally attached to the second end of the flexible band comprises a first and second leg that each has a first end and a second end, wherein the second leg is substantially parallel to and spaced from the first leg. A cavity is defined between the first ends of the first and the second legs. The second ends of the first leg and the second leg are joined. A first engaging member and a second engagement member are attached to the first leg and second leg, respectively. The first and the second engaging members each comprise a sloping portion having a first free end and a second end, the sloping portion extending in an angular direction into the cavity, and a wall abutting the second end of the sloping portion. To lock the locking retainer, the first plug member is inserted within the cavity defined between the first and second legs causing the first prong to engage the first engagement member and the second prong to engage the second engagement member.

20 Claims, 4 Drawing Sheets

LOCKING RETAINER DEVICE

BACKGROUND

The present invention relates generally to strap retainers and, more particularly to strap retainer clips for permanent securing of safety straps to movable structures such as shopping cart devices.

Nylon safety straps are traditionally secured to grocery store carts or other similar vehicles to provide a seatbelt-type child restraint in an effort to assure the safety of an occupant or item that is being transported in the shopping cart. Such devices are securely attached to the shopping cart in a manner such that the retainer clip does not become accidentally detached from the cart. In addition, it is desirable that the strap retainer clip should be resistant to occurrences that take place in the day-to-day operation of shopping carts such as vandalism that results in the damage or the removal of the safety restraint. Many of these occurrences take place due to the fact that shopping carts are left in unsecured areas, such as parking lots, for long periods of time, resulting in various opportunities for vandalic acts.

More importantly, normal wear-and-tear due to the every-day operation of the strap retainer needs to be considered in the construction of a more secure safety retainer clip. In this manner, attachment of the safety clip to the shopping cart carriage is important in several respects. For instance, the nylon strap is prone to rub against metallic parts, such as the carriage or the retainer clip itself, resulting in the weakening of the seat-belt device. Rubbing of the nylon strap may result in tearing and eventual failure of the nylon web itself. Due to this concern, conventional attachment devices such as metallic rings, inflexible metallic clips and metallic grommets are undesirable. Furthermore, it is not uncommon for shopping carts to be exposed to moisture, such as rain, when left outside for long periods of time, resulting in the rusting of metal strap retainers. Therefore, it is desirable to have a retainer clip that is weather resistant and has a strong constitution to withstand rough usage.

The environment in which a safety retainer clip is to be used dictates the desirable characteristics that a suitable safety retainer clip should embody. In this regard, the safety retainer clip should be inexpensive to produce and have a simple construction. Furthermore, it is desirable that the securement of the retainer clip to the shopping cart be possible without the need for a tool or other complicated method of securement. Moreover, it is desirable that the retainer clip have a secure locking mechanism that is resistant to the accidental detachment of the clip.

SUMMARY OF THE INVENTION

The present invention therefore provides a locking retainer that is simple to install and does not require the use of tools or a complicated installation procedure. Furthermore, the present invention provides a retainer clip that is simple and inexpensive to manufacture. Moreover the present invention provides a retainer clip that will withstand rough operating conditions due to stress placed upon the clip from all conceivable angles. Moreover, the present invention provides a retainer clip that attaches a child seatbelt to a grocery store cart or similar device in a permanent and secure fashion. Moreover, the present invention provides a retainer clip that resists the inadvertent and unwanted release of the clip from the shopping cart or similar device due to twisting and other directional forces placed upon the device during use.

A locking retainer according to the present invention includes a flexible band having a first end and a second end. A first plug member is attached to the first end of the flexible band. The plug member defines a first and a second prong which extend from opposite sides thereof. A second plug member is also attached to the second end of the flexible band. The second plug member defines a cavity between first and second legs. The first and second legs define a respective engaging member. In this manner, the first plug member is receivable into the cavity. The first and second engaging members are respectively engagable with the first and second prongs.

BRIEF DESCRIPTION OF THE DRAWINGS

In the drawings, similar reference numerals denote similar elements throughout the several views.

DETAILED DESCRIPTION

Figure 1:
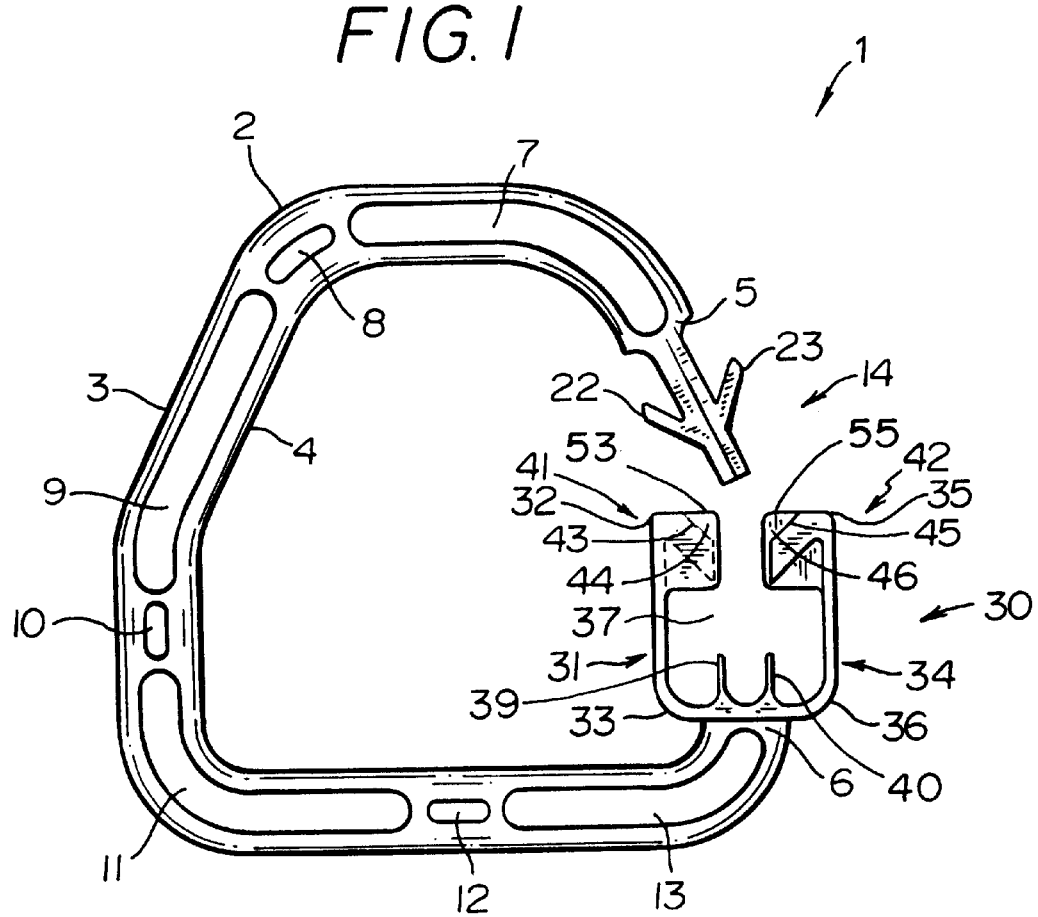
FIG. 1 illustrates a side view of the locking retainer according to an embodiment of the invention.

In the following detailed description and in the several figures of the drawings, like elements are identified with like reference numerals.

FIG. 1 is a side view of the strap retainer illustrating the major elements thereof. Locking retainer 1 is preferably integrally formed from molded plastic. The locking retainer 1 basically comprises a flexible band 2, and a locking mechanism 50, illustrated in FIG. 5, made up of a male plug member 14 and a female plug member 30.

Figure 2:
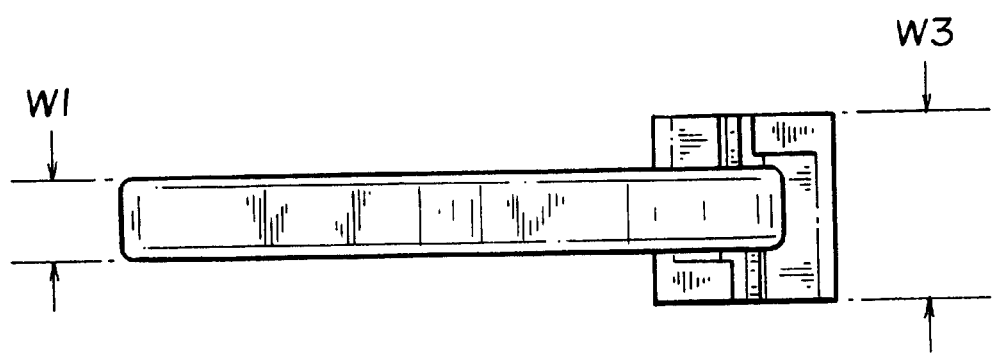
FIG. 2 illustrates a top view of the locking retainer.

Referring now in detail to FIGS. 1 and 2, the flexible band 2 has a generally arcuate shape, preferably in the form of a D, and has a width W1, an outside surface 3, an inside surface 4, a first end 5, and a second end 6. A plurality of apertures 7–13, are defined between the outside surface 3 and the inside surface 4 of the flexible band 2 in a manner such that strength and flexibility are afforded to the locking retainer during the operation thereof.

Referring to FIGS. 1–4, male plug member 14 is integrally attached to the first end 5 of the flexible band 2 and is relatively stiff. Male plug member 14 has an extending member 15 with a bottom surface 16, a top surface 17, a first end 18 attached to the first end 5 of the flexible band 2 and a second free end 19. The extending member 15 has a width W2, that is substantially the same as a width W3 of the female plug member 30 and greater than the width WI of the flexible band 2, and has a first side 20 and a second side 21. A first prong 22 and a second prong 23 extend from the bottom and top surfaces 16 and 17 of the extending member 15, respectively, at an angle to form a substantially arrow-shaped profile, as shown in FIG. 1.

Figure 3:
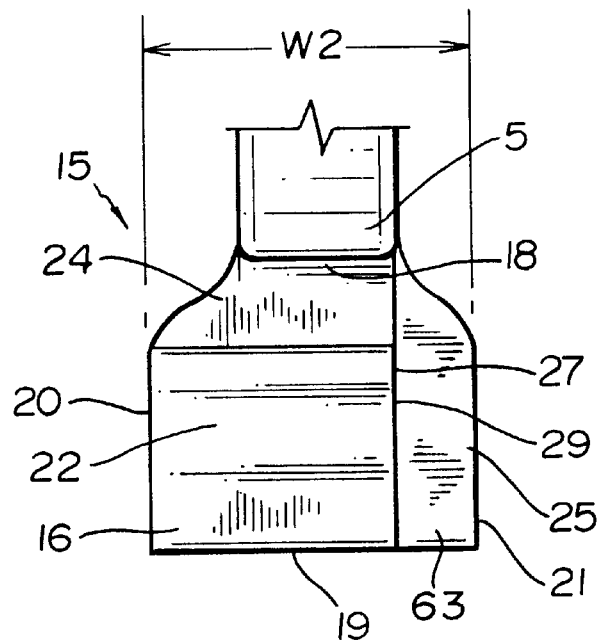
FIG. 3 illustrates a top view of a male plug member according to the invention.
Figure 4:
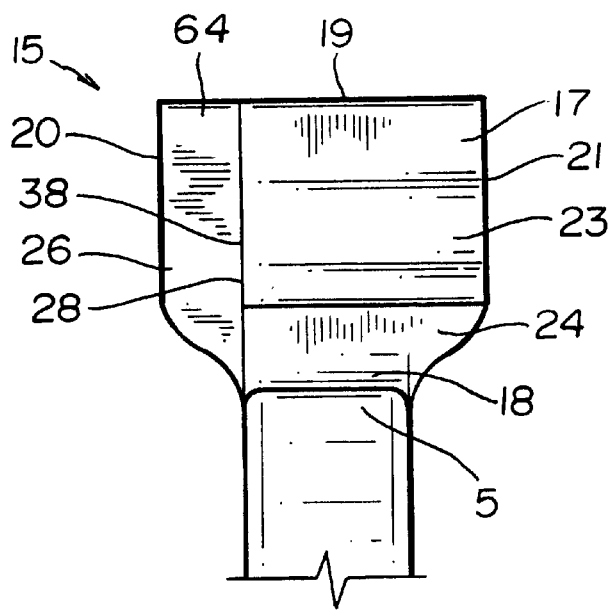
FIG. 4 illustrates a bottom view of a male plug member according to the invention.

Referring to FIGS. 3 and 4, the extending member 15 has a main portion 24, a first flange 25, and a second flange 26. The first flange 25 is defined by a first step cut 27 formed in the bottom surface 16 and extends from the main portion 24 of extending member 15 to the second side 21 thereof. Similarly, the second flange 26 is defined by a second step cut 28 formed in the top surface 17 and extends from the main portion 24 of the extending member 15 to the first side 20 thereof. First and second walls 29 and 38, defined by the first and second step cuts 27 and 28, are formed in the extending member 15 on the bottom and top surfaces 16 and 17 thereof. The first prong 22, formed on the bottom surface 16, extends from the first side 20 to the first wall 29. The second prong 23, formed on the top surface 17, extends from the second side 21 to the second wall 38.

Figure 5:
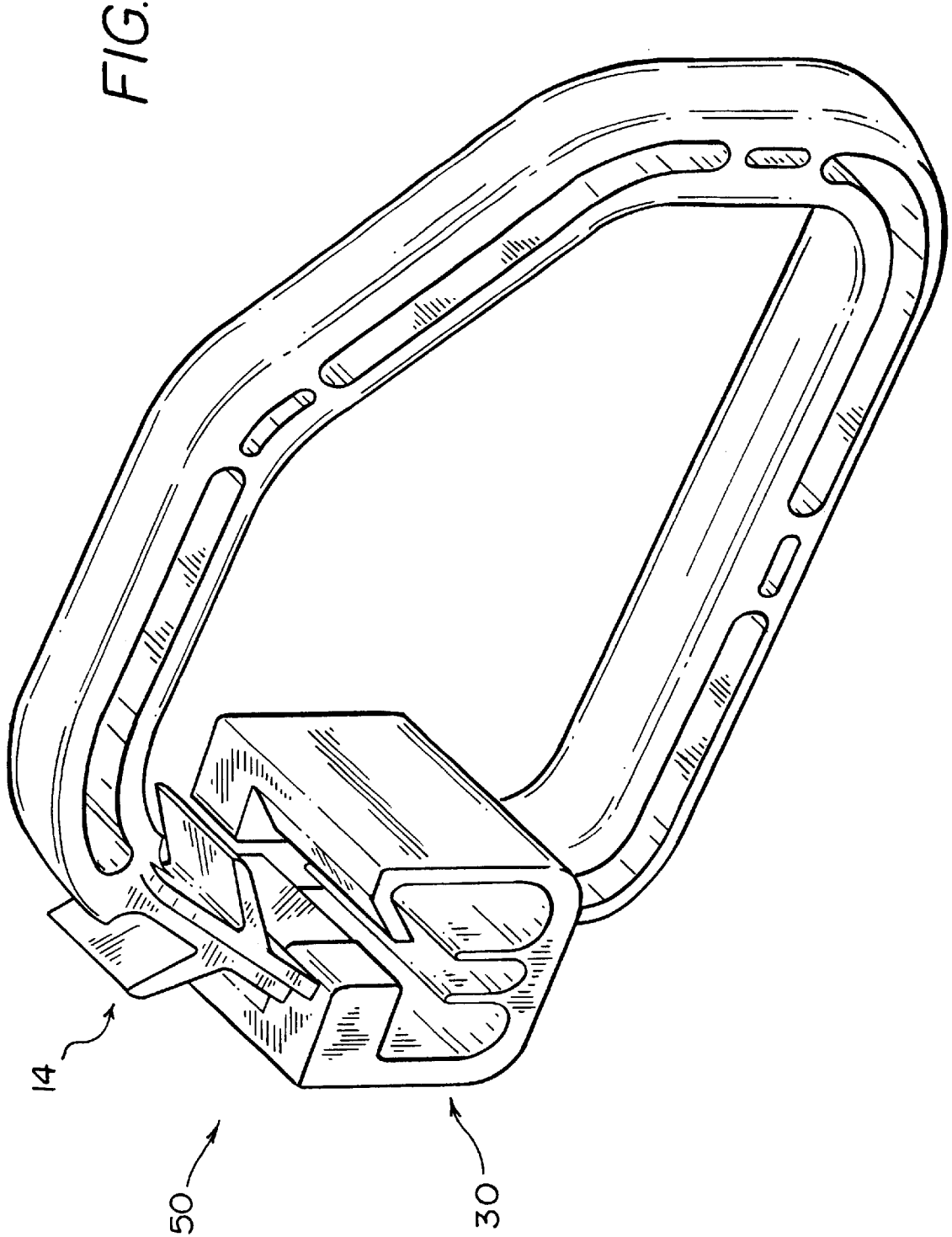
FIG. 5 illustrates a perspective view of the locking retainer according to the present invention.

FIG. 5 is a perspective view of the present invention illustrating the locking mechanism 50 of the present invention. Locking mechanism 50 is engaged by inserting male plug member 14 into female plug member 30 to effect a permanent securement of a strap (not shown) to a shopping cart or similar vehicle (not shown).

Figure 6:
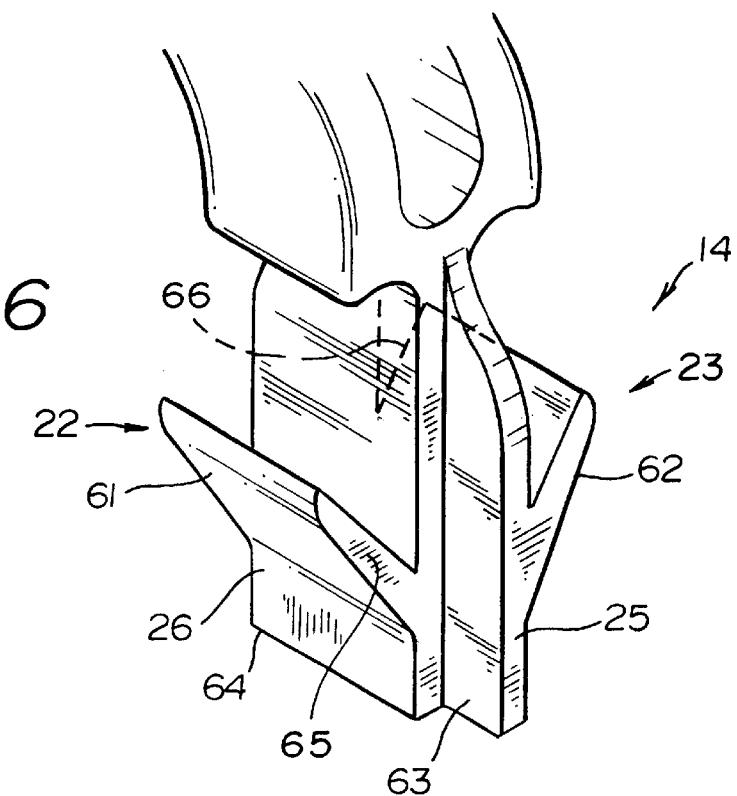
FIG. 6 illustrates a perspective view of a male plug member according to the present invention.
Figure 7:
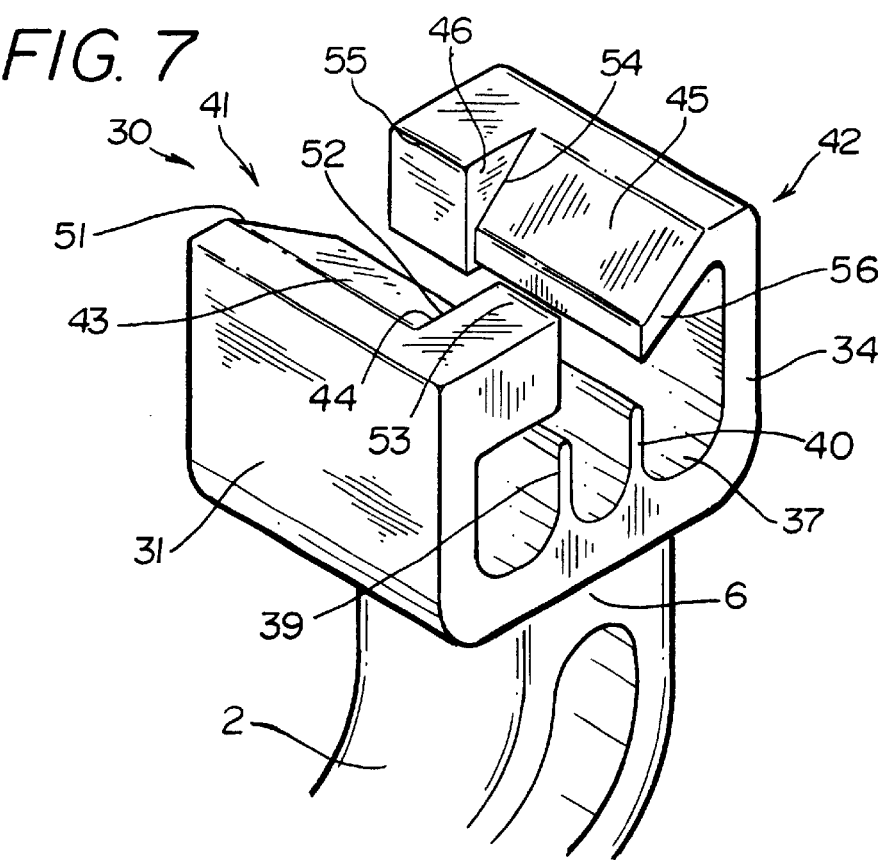
FIG. 7 illustrates a perspective view of a female plug member according to the present invention.

As shown in FIG. 6, a perspective view of male plug member 14 is illustrated to further describe male plug member 14 of the present invention. A first exterior sloped surface 61 is defined by the first prong 22 and a second exterior sloped surface 62 is defined by the second prong 23. The first flange 25 defines a bulb guide plane 63, as shown in FIG. 3, on the planar surface thereof. Similarly, the second flange 26 defines a second bulb guide plane 64, as shown in FIG. 4, that is substantially the same width as the first bulb guide plane 63. A first prong wall 65 of the first prong 22 is configured to slidably mate with guiding wall 44, as shown in FIG. 7, of the first engagement member 41 when the locking mechanism 50 is engaged. Similarly, a second prong wall 66 is configured to slidably mate with guiding wall 46, as shown in FIG. 7, of the second engagement member 42 when the locking mechanism 50 is engaged.

Referring to FIGS. 1 and 7, female plug member 30 is integrally attached to the second end 6 of the flexible band 2 and forms the second part of the locking mechanism. As shown in FIG. 1, a first leg 31, having a first end 32 and a second end 33, and a second leg 34, having a first end 35 and a second end 36, are substantially parallel to and spaced from one another to define a cavity 37 therebetween. The second end 33 of the first leg 31 and the second end 36 of the second leg 34 are joined to form the bottom of the cavity 37. In this manner, the first and second legs 31 and 34 are configured to deflect from a first original position to a second position upon the insertion of the male plug member 14. As shown in FIGS. 1 and 7, first and second stabilizing ribs 39 and 40, which are parallel to and spaced from one another, are formed on the bottom of the cavity 37 and extend a distance into the interior thereof. The first and second stabilizing ribs 39 and 40 extend the entire length of cavity 37. Integrally attached to the first and second legs 31 and 34 are first and second engagement members 41 and 42. The first engagement member 41 includes a sloping portion 43, shown by the dotted lines, a contact bulb 53, shown in FIG. 7, and a guiding wall 44. Similarly, the second engagement member 42 includes an oppositely configured sloping portion 45, and a contact bulb 55, shown in FIG. 7, and guiding wall 46.

A perspective view of female plug member 30 is illustrated in FIG. 7 to further describe female plug member 30 of the present invention. As shown in FIGS. 1 and 7, sloping portion 43 includes a first free end 51 and a second end 52 that abuts guiding wall 44. Contact bulb 53 is formed on the engagement member 41 and is adjacent to the guiding wall 44. Similarly, sloping portion 45 includes a first free end 56 and a second end 54 that abuts guiding wall 46. Contact bulb 55 is formed on the engagement member 42 and is adjacent to the guiding wall 46.

The operation of the locking mechanism will now be described. The extending member 15 of the male plug member 14 is inserted into cavity 37 in a manner such that the first prong 22 engages the sloping portion 43 of the first engagement member 41 and the second prong 23 engages the sloping portion 45 of the second engagement member 42. During the insertion of the male plug member 14, the first and second walls 29 and 38 of the extending member 15 abut the first and second guiding walls 44 and 46, respectively, in a manner such that lateral movement of the male plug member 14 is prohibited. As the first and second prongs 22 and 23 ride over the sloping portions 43 and 45, the first and second prong walls 65 and 66 engage the guiding walls 44 and 46, respectively, thus causing the first and second legs 31 and 34 to deflect in an outwardly direction and allowing the contact bulbs 53 and 55 to engage the male plug member 14 while the male plug member 14 is forced downward into the cavity 37. In this manner, the sloping portions 43 and 45 of the first and second legs 31 and 34 of the female plug member 30 slidably mate with the exterior sloped surfaces 61 and 62, respectively, of the first and second prongs 22 and 23.

At this point, the free end 19 of the extending member 15 is aligned between the first and second stabilizing ribs 39 and 40. As the free end 19 is forced between the stabilizing ribs 39 and 40, the first and second legs 31 and 34 'snap' back to their original positions thus allowing the sloping portions 43 and 45 and the guiding walls 44 and 46 to engage the first and second prongs 22 and 23, respectively, of the male plug member 14. Once the locking mechanism 50 is engaged, the prong walls 65 and 66 engage the guiding walls 44 and 46 in a manner that lateral movement and thus disengagement of the locking mechanism is prevented. In other words, the first and second prongs 22 and 23 are captured by the first and second engagement members 41 and 42. The stabilizing ribs 39 and 40 are configured to prevent the premature disengagement of the locking mechanism 50 during a twisting or flexing motion of the flexible band 2 during operation of the locking retainer 1.

In this manner, the locking retainer may be securely attached to the wire (not shown) of the shopping cart or other similar vehicle (not shown).

From the foregoing, it will be appreciated that the locking mechanism provided by the invention provides an effective and efficient technique for securing the seat belt to the shopping cart. This specific locking arrangement provides the user with a more stable and secure attachment of the seat belt to the shopping cart. Lateral and twisting movements of the locking mechanism parts that result in premature or unwanted disengagement of the locking mechanism are severely reduced resulting in a safer and more reliable locking device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

It will be evident that there are additional embodiments and applications which are not disclosed in the detailed description but which clearly fall within the scope of the present invention. The specification is, therefore, intended not to be limiting, and the scope of the invention is to be construed by the following claims and their equivalents.

What is claimed is:

1. A locking retainer device, comprising:
   a flexible band having a first end and a second end;
   first plug member attached to the first end of the flexible band, the first plug member comprising first and second prongs extending from opposites sides, wherein the first and second prongs are off-center and do not extend across the entire width of the first plug member; and
   a second plug member integrally attached to the second end of the flexible band, the second plug member comprising first and second legs wherein a cavity is defined between the first and second legs with each of the first and second legs defining a respective engaging member,
   wherein the first plug is receivable into the cavity and the first and second engaging members are respectively engagable with the first and second prongs.

2. The locking retainer device according to claim 1, wherein each of the first and second legs of the second plug member has a sloping portion to slidably mate with an exterior sloped surface of a respective prong of the first plug member and each of the first and second legs of the second plug member defines a guiding wall to slidably mate with a corresponding prong wall of the first plug member.

3. The locking retainer device according to claim 1, wherein the second plug member further defines a plurality of ribs extending into the cavity to retain the first plug member with in the cavity.

4. The locking retainer device according to claim 1, wherein a plurality of apertures are formed between outer and inner surfaces of the flexible band.

5. The locking retainer device according to claim 1, wherein the second plug member further comprises at least one stabilizing rib formed within the cavity, whereby the at least one stabilizing rib engages the first plug member to prevent disengagement during a twisting or flexing motion of the flexible band.

6. The locking retainer device according to claim 1, wherein the engaging members of the first and second legs of the second plug member further comprise guiding walls which help prevent disengagement of the first plug member from the second plug member.

7. The locking retainer device according to claim 1, wherein the first and second prongs are off-center and do not extend across the entire width of the first plug member.

8. The locking retainer device according to claim 1, wherein the first plug member defines top, bottom, left, and right surfaces and a width, and the first prong is formed on one of the top or bottom surfaces and extends from one of the left or right surfaces and the second prong is formed on the other of the top or bottom surfaces and extends from the other of the left or right surfaces, whereby the first prong and second prong do not extend across the entire width of the male plug member.

9. The locking retainer device according to claim 1, wherein the second plug member further comprises two parallel stabilizing ribs formed within the cavity and configured to prevent disengagement of the first plug member from the second plug member.

10. A d-ring retainer comprising:
    a flexible arcuate band including an inner surface and an outer surface substantially parallel to and spaced from the inner surface, and having a first end and a second end;
    a substantially arrow-shaped first plug member attached to the first end of the flexible band, the first plug member defining first and second prongs extending from opposites sides thereof;
    a second plug member so configured and arranged to permanently receive and secure the first plug member into a cavity thereof and being attached to the second end of the flexible band, the second plug member defining first and second legs wherein at least one of the first or second legs have a contact bulb surface to engage a prong wall of the first or second prong of the first plug member,
    wherein the at least one contact bulb limits lateral movement of the first plug member within the cavity of the second member.

11. The d-ring retainer according to claim 10, wherein the second plug member further defines a second contact bulb surface to engage the first plug member.

12. The d-ring retainer according to claim 10, wherein each of first and second legs of the second plug member has a sloping portion to slidably mate with an exterior sloped surface of a respective prong of the first plug member and each of the first and second legs of the second plug member defines a guiding wall to slidably mate with a corresponding prong wall of the first plug member.

13. The d-ring retainer according to claim 10, wherein the second plug member further defines a plurality of ribs extending into the cavity to retain the first plug member with in the cavity.

14. The d-ring retainer according to claim 10, herein a plurality of apertures are formed between outer and inner surfaces of the flexible band.

15. The d-ring retainer according to claim 10, wherein the first plug member defines a first step cut on a first side and a second step cut on a second side such that the first prong and the second prong do not extend across an entire width of the first plug member.

16. The d-ring retainer according to claim 10, wherein the second plug member further comprises at least one stabilizing rib formed within the cavity, whereby the at least one stabilizing rib engages the first plug member to prevent disengagement during a twisting or flexing motion of the flexible band.

17. A locking retainer device, comprising:
    a flexible band having a first end and a second end, wherein a plurality of apertures are formed between outer and inner surfaces of the flexible band;
    a first plug member attached to the first end of the flexible band, the first plug member defining first and second prongs extending from opposites sides thereof, the first plug member defining a first step cut on a first side and a second step cut on a second side such that the first prong and the second prong do not extend across an entire width of the first plug member; and
    a second plug member attached to the second end of the flexible band, the second plug member defining a cavity between first and second legs with each of the first and second legs defining a respective engaging member, the second plug member defining a plurality of ribs extending into the cavity to retain the first plug member within the cavity;
    wherein the first plug member is receivable into the cavity and the first and second engaging members are respectively engagable with the first and second prongs, and each of the first and second legs of the second plug member has a sloping portion to slidably mate with an exterior sloped surface of a respective prong of the first plug member and each of the first and second legs of the second plug member defines a guiding wall to slidably mate with a corresponding prong wall of the first plug member.

18. A locking retainer device, comprising:

a flexible band having a first end and a second end;

a first plug member attached to the first end of the flexible band, the first plug member comprising first and second prongs extending from opposites sides, wherein the first and second prongs are off-center and do not extend across the entire width of the first plug member; and a second plug member attached to the second end of the flexible band, wherein the first plug member is engagable with the second plug member.

19. A locking retainer device, comprising:

a flexible band having a first end and a second end;

a first plug member attached to the first end of the flexible band, the first plug member comprising first and second prongs extending from opposites sides;

a second plug member attached to the second end of the flexible band, the second plug member comprising first and second legs wherein a cavity is defined between the first and second legs, and a plurality of ribs extending into the cavity to retain the first plug member within the cavity, wherein the first plug member is engagable with the second plug member.

20. A locking retainer device, comprising:

a flexible band having a first end and a second end;

a first plug member attached to the first end of the flexible band, the first plug member comprising first and second prongs extending from opposites sides;

a second plug member integrally attached to the second end of the flexible band, the second plug member comprising first and second legs wherein a cavity is defined between the first and second legs with each of the first and second legs defining a respective engaging member, wherein the first plug member is receivable into the cavity and the first and second engaging members are respectively engagable with the first and second prongs, and wherein each of the first and second legs of the second plug member has a sloping portion to slidably mate with an exterior sloped surface of a respective prong of the first plug member and each of the first and second legs of the second plug member defines a guiding wall to slidably mate with a corresponding prong wall of the first plug member.

* * * * *